United States Patent [19]
Ikekawa et al.

[11] 3,928,397
[45] Dec. 23, 1975

[54] NEW 5-CHOLESTENE DERIVATIVES AND PREPARATION THEREOF

[75] Inventors: Nobuo Ikekawa; Masuo Morisaki; Julieta Rubio Lightbourn, all of Tokyo; Masao Seki, Komae, all of Japan

[73] Assignee: Eisai Co., Ltd., Japan

[22] Filed: Jan. 6, 1975

[21] Appl. No.: 538,772

Related U.S. Application Data

[63] Continuation-in-part of Ser. No. 446,108, Feb. 26, 1974.

[30] Foreign Application Priority Data

Mar. 2, 1973  Japan.................. 48-24261
Mar. 2, 1973  Japan.................. 48-24262

[52] U.S. Cl.................. 260/397.2; 424/238
[51] Int. Cl.²................................ C07J 9/00
[58] Field of Search.................. 260/397.2

[56] References Cited
UNITED STATES PATENTS

| | | | |
|---|---|---|---|
| 3,715,374 | 2/1973 | De Luca | 260/397.2 |
| 3,739,001 | 6/1973 | De Luca | 260/397.2 |
| 3,822,254 | 7/1974 | Patridge, Jr. et al. | 260/397.2 |

*Primary Examiner*—Elbert L. Roberts
*Attorney, Agent, or Firm*—Wenderoth, Lind & Ponack

[57] ABSTRACT

New 5-cholesten-$3\beta,24,25$- or $3\beta,25,26$-triol and esters thereof, which are valuable intermediates for the production of active vitamin $D_3$, are provided by a process wherein the protected $3\beta$-hydroxy-5,24- or -5,25-cholestadiene is treated with osmium tetroxide to form osmate ester thereof and the latter is decomposed to the corresponding 24,25- or 25,26-dihydroxy compound, and, if necessary, the $3\beta$-hydroxy-protected group thereof is splitt off to produce the 5-cholesten-triol and one or more of the hydroxy groups of the resulting products are esterified with acylating reagent.

9 Claims, No Drawings

NEW 5-CHOLESTENE DERIVATIVES AND PREPARATION THEREOF

This is a continuation-in-part application of Serial No. 446,108 filed February 26, 1974.

This invention relates to a new 5-cholestene derivatives and a process for the preparation thereof.

The new 5-cholestene derivatives according to the present invention are represented by the following formula:

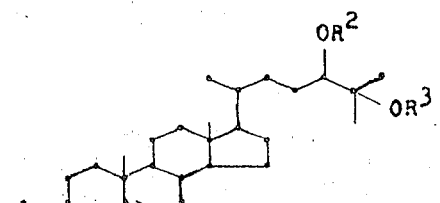

Ia or

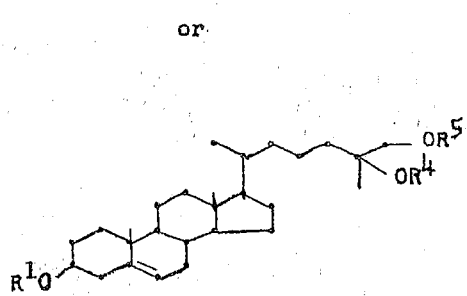

Ib wherein $R^1$ is hydrogen, alkanoyl, aroyl or hydroxy-protecting group; and each of $R^2$, $R^3$, $R^4$ and $R^5$ is hydrogen, alkanoyl, aroyl or trialkylsilyl.

Through out the specification and claims, the term "alkanoyl" refers to the groups derived from lower aliphatic carboxylic acid, such as acetyl, propionyl, butyryl and the like; the term "aroyl" refers to the groups derived from aromatic carboxylic acid, such as benzoyl or substituted benzoyl; and finally, the term "hydroxy-protecting group" refers to any of the substituents usually used for the protection of hydroxy group on steroid nucleus. Representatives of such hydroxy-protecting groups include aliphatic or aromatic hydrocarbon residue such as methyl, ethyl and benzyl, and alkanoyl or aroyl such as aforementioned.

The followings are the representatives of the new 5-cholestene derivatives intended in the present invention:

5-cholesten-3β,24,25-triol,
5-cholesten-3β,24,25-triol 3-acetate,
5-cholesten-3β,24,25-triol 3-benzoate,
5-cholesten-3β,24,25-triol 3,24,25-triacetate,
5-cholesten-3β,24,25-triol 3,24-diacetate,
5-cholesten-3β,24,25-triol 3β,24-dibenzoate,
5-cholesten-3β,24,25-triol 3β,24,25-tribenzoate,
25-trimethylsilyloxy- 5-cholesten-3β,24R-diol dibenzoate,
25-trimethylsilyloxy- 5-cholesten-3β,24S-diol dibenzoate,
3β-methoxy-5-cholesten-24,25-diol,
5-cholesten-3β,25,26-triol,
5-cholesten-3β,≡,26-triol 3-acetate.
5-cholesten-3β,25,26-triol 3-benzoate,
5-cholesten-3β,25,26-triol 3,25,26-tripropionate, and
3β-methoxy-5-cholesten-25,26-diol.

5-Cholesten-3β,24,25-(or -3β,25,26-)triol and esters thereof of the aforementioned formula Ia or Ib of the present invention can easily be converted to 24,25-(or 25,26-)-dihydroxycholecalciferol and esters thereof by the reaction sequence of:

i. bromination to form 7-bromo derivative;
ii. dehydrobromination to form 7-dehydro derivative; and
iii. ultraviolet ray irradiation to form the dihydroxycholecalciferol.

It is known that the dihydroxycholecalciferols are the metabolite of cholecalciferol, i.e., vitamin $D_3$, and ones of the active forms of vitamin $D_3$. They have been obtained only in a minute amount by a troublesome isolation procedure from blood or tissue of the animals which had been administered a large amount of cholecalciferol, and their production by sole chemical method is as yet unknown. Consequently, the new compounds of the present invention are valuable as the intermediate for the commercial production of 24,25-(or 25,26-)dihydroxycholecalciferol.

3β-Protected-hydroxy-5,24-(or -5,25-)cholestadienes having the respective formula:

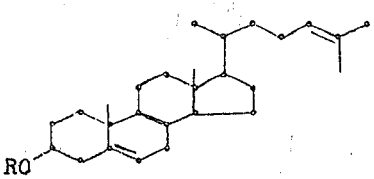

IIa or

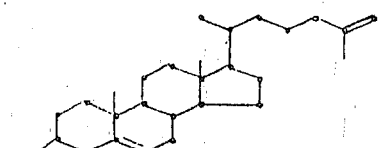

IIb wherein R in the both cases is hydroxy-protecting group, is the starting material employed for the production of the compounds of the aforementioned formula Ia or Ib in accordance with the present invention. Some of the compounds of the formulae IIa and IIb are known, while others may be produced according to the known methods. For instance, 5,24-cholestadien-3β-ol acetate of the formula IIa where R = acetyl, i.e., desmosterol acetate, and 5,25-cholestadien-3β-ol acetate of the formula IIb where R = acetyl, i.e., 25-dehydrocholesterol acetate, may simultaneously be produced in an admixture, when 5-cholesten-3β,25-diol 3-acetate, i.e., 25-hydroxylcholesterol acetate is treated with phosphorous oxychloride. The resulting 5,24-diene and 5,25-diene compounds may separately be obtained from the reaction mixture by preparative thin-layer chromatography; see, J. Lipid Res., 8, 152 (1967).

In carrying out the process of the present invention, 3β-protected-hydroxy steroid (IIa or IIb) is first reacted with osmium tetroxide in the presence of a solvent. Examples of solvent suitable for this purpose are ether, benzene, dioxan, chloroform, carbon tetrachloride, ethyl acetate, etc., and the mixture thereof. The reaction temperature and the reaction time are not critical, but the reaction may usually be carried out at room temperature or below, preferably at room temperature, and for several hours to a few days. There is thus obtained the osmate ester wherein a molecule of osmium tetroxide has entered into the double bond between 24- and 25- or 25- and 26-positions of the starting material.

After removal of the solvent, the resulting osmate ester is treated with a reagent capable of decomposing the osmate ester. Any of the reagents known in the arts to decompose osmate ester may be utilized for this purpose. Representatives of the reagent include pyridine-aqueous alkali bisulfite; ethanol-aqueous alkali sulfite; mannitol-aqueous alkali hydroxide; zinc-acetic acid; concentrated hydrochloric acid; potassium chlorate-sulfuric acid; chromic acid-acetic acid; formaldehyde-aqueous alkali hydroxide; hydrogen sulfide and the like.

As the result of the decomposition of the osmate ester, there is obtained $3\beta$-protected-hydroxy-5-cholesten-24,25-(or -25,26-)diol or corresponding $3\beta$-free hydroxy steroid, depending upon the reagent and reaction condition employed. Each of the steroid products may be isolated from the reaction mixture by a conventional isolation procedure.

$3\beta$-Hydroxy-protecting group of the resulting $3\beta$-protected-hydroxy steroids, if necessary, is split off by a conventional procedure such as an alkaline hydrolysis to give the corresponding $3\beta$-free hydroxy compound, i.e., 5-cholesten-$3\beta$,24,25-(or -$3\beta$,25,26-) triol. If desired, $3\beta$-protected-hydroxy-5-cholesten-24,25-(or -25,26-)diol or the corresponding $3\beta$-free hydroxy derivative may further be esterified in accordance with a usual procedure by the aid of acid anhydride, acid halide and the like, to mono-, di- or tri-ester of 5-cholesten-$3\beta$,24,25-(or -$3\beta$,25,26-)triol wherein one or more of the free hydroxy groups on the steroid nucleus and/or side chain carries the acyl radical or radicals.

The invention will be illustrated by the following Examples.

EXAMPLE 1

One gram of desmosterol acetate (or 5,24-cholestadien-$3\beta$-ol) and 589 mg. of osmium tetroxide were suspended in 40 ml. of dry ether. The resulting suspension was stirred at room temperature for 19 hours. After removal of the ether by distillation, there were added 60 ml. of pyridine, 45 ml. of water and 2 g. of sodium bisulfite, and the mixture was stirred at room temperature for further 19 hours. The resulting reaction mixture was extracted with ether. The ethereal extract was washed successively with a dilute hydrochloric acid and water, dried on anhydrous sodium sulfate and evaporated up to dry. 1.008 g. of 5-cholesten-$3\beta$,24,25-triol $3\beta$-acetate were obtained, which amounted to 93.4% of the theoretical yield.

In a silica gel thin-layer chromatography, the product gave a single spot. MP: 152°C. (from acetone).

Elementary analysis:
$C_{29}H_{48}O_4$ (molecular weight of 460.67)

|  | C | H |
|---|---|---|
| Calculated (%): | 75.60 | 10.50 |
| Found (%): | 75.34 | 10.56 |

EXAMPLE 2

100 mg. of 5-cholesten-$3\beta$,24,25-triol $3\beta$-acetate obtained in the preceding Example were dissolved in a mixture of 0.3 ml. of pyridine and 0.3 ml. of acetic anhydride. After standing overnight, the reaction mixture was poured onto ice-water. The resulting crystalline substance was recovered by filtration, and recrystallized from n-hexane. There was obtained 5-cholesten-$3\beta$,24,25,-triol $3\beta$,24-diacetate having the melting point of 167.5°C. to 168°C. (from n-hexane).

Elementary analysis:
$C_{31}H_{50}O_5$ (molecular weight of 502.71)

|  | C | H |
|---|---|---|
| Calculated (%): | 74.06 | 10.03 |
| Found (%): | 74.22 | 10.03 |

NMR$_{ppm}$:

| | | | | | | |
|---|---|---|---|---|---|---|
| 1.10 | ( | 6 | H | s*¹ | C—26,27—$CH_3$ | ) |
| 2.00 | ( | 3 | H | s | C—3—$CH_3CO$ | ) |
| 2.08 | ( | 3 | H | s | C—24—$CH_3CO$ | ) |
| 4.70 | ( | 2 | H | d*² | C—3,24—H | ) |
| 5.35 | ( | 1 | H | m*³ | C—6—H | ) |

In the above, *¹s = singlet; *²d = doublet; and *³m = multiplet.

EXAMPLE 3

To 20 ml. of dry ether, there were introduced 500 mg. of 5,25-cholestadien-$3\beta$-ol acetate and 295 mg. of osmium tetroxide. The resulting reaction mixture was stirred at room temperature for 24 hours. After removal of the ether, 30 ml. of pyridine, 22 ml. of water and 1 g. of sodium bisulfite were added successively to the residue, and the mixture was stirred at room temperature for 19 hours. The reaction mixture was extracted with ether, and the ethereal extract was washed with a dilute hydrochloric acid followed by water, dried on anhydrous sodium sulfate and the solvent was removed by distillation. Crude reaction product thus obtained was purified by a thin-layer chromatography on a silica gel plate, eluting with a mixture of benzene and ethyl acetate (10 : 1 – 5 : 1). There were obtained 380.6 mg. of 5-cholesten-$3\beta$,25,26-triol $3\beta$-acetate amounting to 70.5% of the theoretical yield. MP: 169° – 171°C. (from ethanol : water).

Elementary analysis:
$C_{29}H_{48}O_4$ (molecular weight of 460.67)

|  | C | H |
|---|---|---|
| Calcurated (%): | 17.60 | 10.50 |
| Found (%): | 75.08 | 10.26 |

NMR$_{ppm}$:

| | | | | | | |
|---|---|---|---|---|---|---|
| 1.14 | ( | 3 | H | s*¹ | C—27—$CH_3$ | ) |
| 2.01 | ( | 3 | H | s | C—3—$CH_{3}CO$ | ) |
| 3.41 | ( | 2 | H | s | C—26—$CH_2$ | ) |
| 4.60 | ( | 1 | H | m*² | C—3—H | ) |
| 5.35 | ( | 1 | H | m | C—6—H | ) |

In the above, *¹s = singlet; *²m = multiplet.

EXAMPLE 4

To 20 ml. of dry ether, there were introduced 500 mg. of 5,25-cholestadien-$3\beta$-ol acetate and 295 mg. of osmium tetroxide. The resulting mixture was stirred at room temperature for 24 hours. After removal of the ether, 30 ml. of ethanol, 48 ml. of water and 1.47 g. of sodium sulfite were added to the residue, and the mixture was refluxed for 3 hours. The reaction mixture was extracted with ether, and the ethereal extract was washed successively with a dilute hydrochloric acid and water, dried on anhydrous sodium sulfate and the solvent was distilled off. The resulting crude reaction product was purified by the chromatography same as that mentioned in Example 3. There were obtained 336.3 mg. of 5-cholesten-$3\beta$,25,26-triol $3\beta$-acetate amounting to 62.3% of the theoretical yield.

EXAMPLE 5

100 mg. of 5-cholesten-$3\beta$,24,25-triol $3\beta$-acetate were refluxed in 5 ml. of methanolic solution of 5% potassium hydroxide for 30 minutes. The reaction mixture was diluted with water and then extracted with ethyl acetate. The organic layer of the extract was washed with brine, and dried on anhydrous sodium sulfate. Evaporation of the solvent gave 90 mg. of 5-cholesten-3β,24,25-triol as white powder having the melting point of 185°C. to 187°C. (from ethyl acetate).

EXAMPLE 6

100 mg. of 5-cholesten-3β,25,26-triol 3β-acetate were hydrolyzed with 5 ml. of 5% potassium hydroxide solution in methanol using the essentially same manner as in the preceding EXAMPLE 5. There were thus obtained 90 mg. of 5-cholesten-3β,25,26-triol as white powder melting at 180° – 192°C. (from dimethyl ketone).

EXAMPLE 7

433 mg. of 5-cholesten-3β,24,25-triol were treated overnight with 1.0 ml. of benzoyl chloride in 2 ml. of dry pyridine at room temperature. The reaction mixture was poured into ice-water and extracted with ether. The ethereal layer was concentrated under reduced pressure. The resulting crude produce was chromatographed on a column which was packed with 20 g. of silica gel, and purified by using hexane-benzene (1:1) as a solvent for elution. The elute was recovered as aliquot of fractions, each containing 50 ml.

The fraction Nos. 7–10 were combined. By removing the solvent from the combined fractions, there were obtained 148 mg of less polar 5-cholesten-3β,24R,25-triol tribenzoate as crystals having the melting point of 173°C to 174°C. (from acetone).

From the fraction Nos. 15–23, there were obtained, after the removal of the solvent, 132 mg. of more polar 5-cholesten-3β,24S, 25-triol tribenzoate as an amorphous powder.

457 mg of 5-cholesten-3β,24,25-triol 3,24-dibenzoate were obtained from the fractions which were eluted with benzene-ethyl acetate (9:1).

EXAMPLE 8

483 mg of 5-cholesten-3β,24,25-triol 3β,24-dibenzoate were dissolved into 2 ml of trimethylsilyl imidazole. The reaction mixture was heated at 90°C for 1 hour, and then extracted with hexane. The extract was washed with water, and dried on sodium sulfate. By distilling off the solvent, 543 mg. of the crude product were obtained. The crude product was purified by chromatography on a column which was packed with silica gel (SiO₂), and eluted with hexane-benzene (1:1) to recover the fractions.

The fractions were again chromatographed on silica gel column, and eluted with hexane-benzane (7:3). The elute was divided every 50 ml.

The fraction Nos. 9–11 were combined. By removing the solvent from the combined fractions, there were obtained less polar 25-trimethylsilyloxy-5-cholesten-3β,24R-diol dibenzoate as white crystals melting at 155° – 156°C. (from hexane).

In the same way, there were obtained, from the fraction Nos. 16–19, more polar 25-trimethylsilyloxy-5-cholesten-3β,24S-diol dibenzoate as white crystals having the melting point of 159° – 160°C. (from hexane).

What is claimed is:

1. 5-Cholestene derivatives represented by the formula:

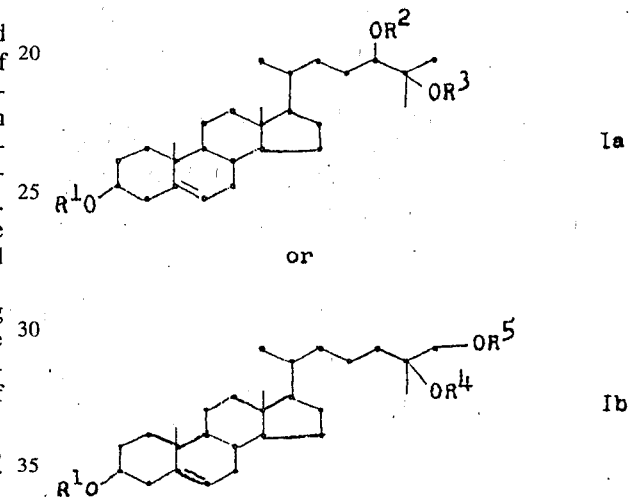

wherein $R^1$ is hydrogen, alkanoyl, aroyl or hydroxy-protecting group, and each of $R^2$, $R^3$, $R^4$ and $R^5$ is hydrogen, alkanoyl, aroyl or trialkylsilyl.

2. 5-Cholesten-3β,24,25-triol 3-acetate.
3. 5-Cholesten-3β,24,25-triol 3,24-diacetate.
4. 5-Cholesten-3β,25,26-triol 3acetate.
5. 5Cholesten-3β,24,25-triol.
6. 5-Cholesten-3β,25,26-triol.
7. 5-Cholesten-3β,24,25-triol 3β,24-dibenzoate.
8. 5-Cholesten-3β,24,25-triol 3β,24,25-tribenzoate.
9. 25-Trimethylsilyloxy-5-cholesten-3β,24-diol dibenzoate.

* * * * *